United States Patent

Scarpino et al.

[11] 3,875,561
[45] Apr. 1, 1975

[54] FLASHING VEHICLE WARNING BEACON WITH LENS AND REFLECTOR

[75] Inventors: John J. Scarpino, Garden City, N.Y.; Daniel B. Ventre, Stamford, Conn.

[73] Assignee: Hope-Tronics Limited, Hempstead, N.Y.

[22] Filed: Sept. 20, 1972

[21] Appl. No.: 290,448

[52] U.S. Cl............ 340/81 R, 240/11.4 R, 340/77
[51] Int. Cl............................................ B60q 1/38
[58] Field of Search.............. 240/1.2, 11.4, 41.3; 340/25, 28, 50, 77, 84, 105, 81 R

[56] References Cited
UNITED STATES PATENTS

| | | | |
|---|---|---|---|
| 1,337,880 | 4/1920 | Benard | 240/1.2 |
| 1,759,609 | 5/1930 | Eskilson | 340/50 UX |
| 1,834,041 | 12/1931 | Bartow | 240/1.2 |
| 1,988,569 | 1/1935 | Rechtin | 340/50 UX |
| 2,015,442 | 9/1935 | Sprung | 240/11.4 R |
| 2,586,374 | 2/1952 | Pennow | 240/1.2 |
| 2,773,171 | 12/1956 | Pennow | 240/1.2 |
| 2,773,172 | 12/1956 | Pennow | 240/1.2 |
| 2,850,716 | 9/1958 | Smale | 340/50 X |
| 3,288,989 | 11/1966 | Cooper | 240/11.4 R |
| 3,436,729 | 4/1969 | Zurcher | 340/25 X |
| 3,488,630 | 1/1970 | Decker et al. | 340/77 |
| 3,504,339 | 3/1970 | Bailey | 340/84 |
| 3,519,984 | 7/1970 | Zychal | 340/25 |
| 3,596,237 | 7/1971 | Barber et al. | 340/25 |
| 3,634,675 | 1/1972 | Madsen et al. | 240/1.2 |

FOREIGN PATENTS OR APPLICATIONS
8,586 0/1913 United Kingdom.............. 240/1.2

*Primary Examiner*—John W. Caldwell
*Assistant Examiner*—Marshall M. Curtis
*Attorney, Agent, or Firm*—Brumbaugh, Graves, Donohue & Raymond

[57] ABSTRACT

A warning beacon that more efficiently distributes light is disclosed. The beacon includes a flashing, largely omnidirectional, central light source, a conical reflector above the light source and an encircling lens system. The light source includes a partly circular, high intensity discharge lamp coaxial with the lens. One of several encircling lenses is selected for the desired beacon characteristics. A convergent lens, resembling, in section, a planoconvex lens, collects light into an encircling aureole of increased intensity emanating from the lens. A reflecting and refracting interior surface will spread the visual source. Fresnel lens sections can be chosen to increase visibility. The reflector diverts ordinarily wasted light. Between the reflector and the lens, light passes up and out to illuminate the beacon's environs. The lens is constructed of segments whose color may differ one from another and from an encasing dome.

9 Claims, 6 Drawing Figures

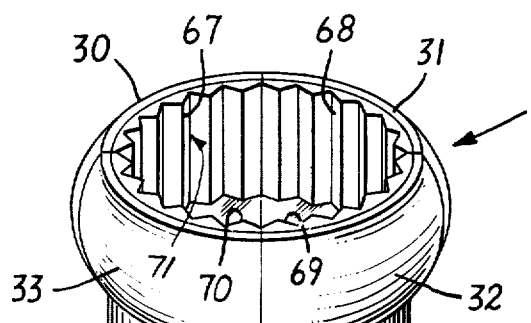
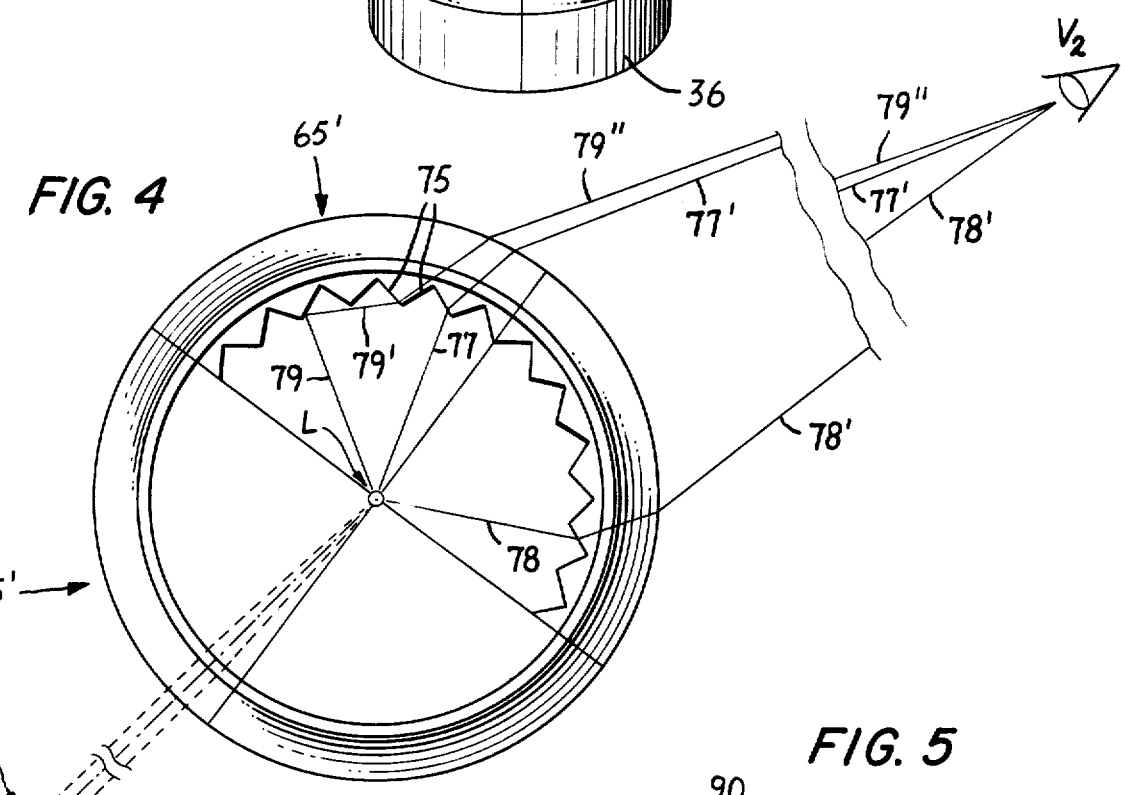
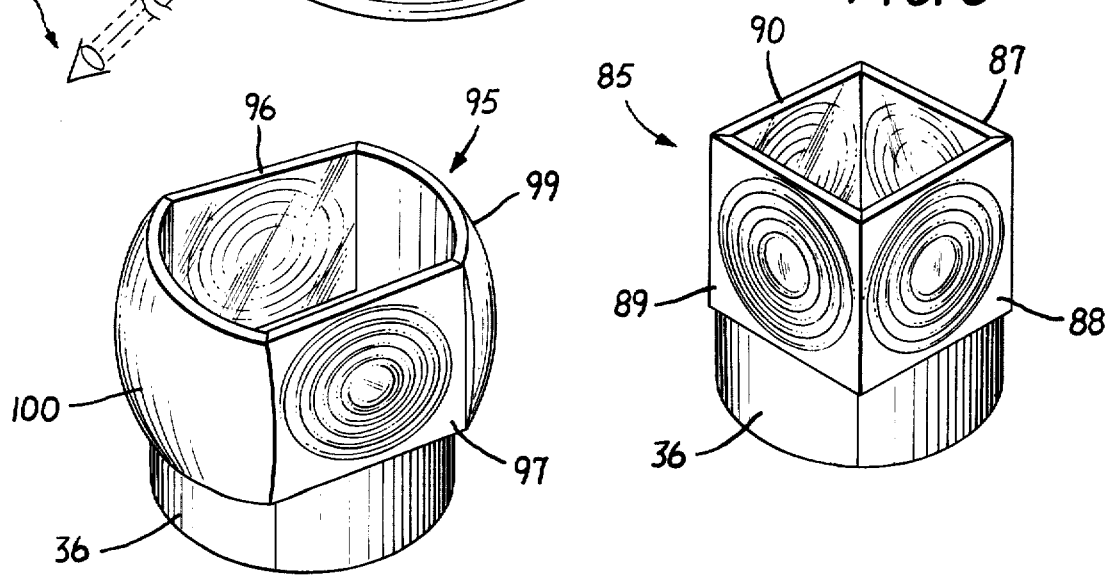
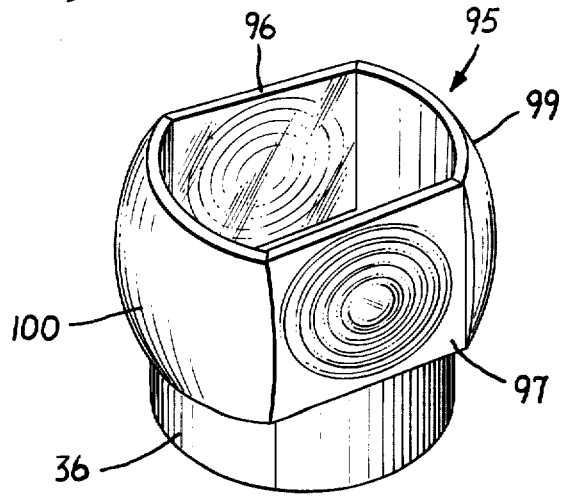

FLASHING VEHICLE WARNING BEACON WITH LENS AND REFLECTOR

BACKGROUND OF THE INVENTION

This invention relates to warning beacons and, more particularly, to flashing beacons that are often mounted on emergency vehicles to signal the vehicle's presence.

Ordinary emergency vehicle beacons are well known. These usually include a colored plastic or glass dome supported atop an emergency vehicle. A flashing effect is commonly produced by intense rotating directional lamps within the beacon dome. These flashing beacons ordinarily illuminate a narrow swath as the lamps rotate. As one moves into direct line of sight with the beacon within the radiating swath, one is alerted of the emergency vehicle's presence. Although a high intensity horizontal band of flashing light is desirable, conventional rotating lamp beacons often give no warning of the presence of an emergency situation to someone outside the area swept by the rotating lamps, or to someone not in direct line of sight to the beacon. Often, a conventionally equipped police car parked a short distance from the summit of even a small hill cannot effectively alert oncoming traffic. In a city, buildings can hide a beacon.

In a beacon's horizontal belt of illumination that most often effectively warns persons in the line of sight, intense flashing is best. Ordinarily, a flashing omnidirectional lamp does not produce the intense horizontal beam which makes most beacons effective when visible. Too great a power drain is usually necessary to increase most omnidirectional lamps' intensity sufficiently for effective, economical use as good warning beacons. Omnidirectional lamps waste light because they do not direct light where it is most needed. For example, light emanating vertically or nearly vertically skyward is wasted. Therefore, if sufficient intensity is provided as is desirable for line of sight warning, similar intense light is wasted entirely or is radiated where only lower intensities are required. Such an arrangement is inefficient.

Known strobe type flashers which use flashing lamps do not provide the optical characteristics best suited to alert. Light color, combinations of light color, light intensity where most needed, redirection of ordinarily wasted light and increased visibility are factors which make a beacon functionally and economically successful. Most available warning lights are not capable of being altered more appropriately to serve a particular use.

SUMMARY OF THE INVENTION

According to this invention, an improved beacon has a light-directing optical system arranged in cooperation with a largely omnidirectional light source. The optical system redistributes the light from the source, gathering rays into more intense emanations where they are put to best use. Lower intensity radiating light illuminates the beacon's immediate environs and gives better than line of sight visibility.

The optical system of the improved beacon includes an encircling lens which alters the emanations from the nondirectional source to serve the desired use of the beacon. A convergent lens collects rays into a narrower, more intense and generally horizontal belt or aureole very effective as an alert at long distances and at night. A multifaceted inner surface on the lens reflects and refracts rays, spreading the visible light source image for better daytime visibility. A Fresnel lens section gives high unidirectional visibility day and night and at substantial distances. A horizontal discharge lamp, particularly a circular one paralleling the lens, contributes toward highly intense lighting in the encircling horizontal belt and is particularly effective with a convergent encircling lens.

A reflector above the light source redirects wasteful skyward rays. The reflected rays pass through the lens or between the lens and the reflector. The reflector and the lens are spaced to define an open space between them. This permits rays to pass up and out in the directions best suited for lighting nearby higher surroundings. Trees and nearby buildings are lighted, for example, and hanging fog and dust are lighted to produce a visible halo. This lighting, called splash lighting, alerts persons out of the line of sight. In addition, some downward splash light illuminates the vehicle carrying the beacon and increases the vehicle's visibility.

The encircling lens is molded in segments whose colors may vary. For example, forward and rearward facing segments on a vehicle may be different colors. Differently colored front and back light is often required in police and other emergency vehicles. So too the lens configuration may vary from one segment to the next. An encasing dome determines the color of the splash lighting that escapes the lens. White or blue-white light is very effective as splash light. Light from the reflector is visible to the line of sight viewer as well. When white or blue-white light from the reflector is combined with another through the lens color, red for example, the flashing beacon becomes particularly visually alarming. In traffic this penetrating display alerts even pedestrians and sleepy or road-dazed drivers.

BRIEF DESCRIPTION OF THE DRAWINGS

A more complete understanding of the invention is available from a consideration of the following detailed description of preferred, exemplary embodiments illustrated in the accompanying drawings. In the drawings:

FIG. 3 is a perspective view of a convergent lens according to FIGS. 1 and 2 with a refracting and reflecting interior according to the invention.

FIG. 4 is a diagrammatic illustration of the lens of FIG. 3 and shows the visual effect of the lens interior.

FIG. 5 is a perspective view of an alternate lens configuration according to the invention and in which the lens segments are Fresnel lenses.

FIG. 6 is a perspective view of another alternate lens configuration according to the invention and in which alternate lens segments are convergent and Fresnel lenses.

DETAILED DESCRIPTION OF A PREFERRED EMBODIMENT

Figure 1:
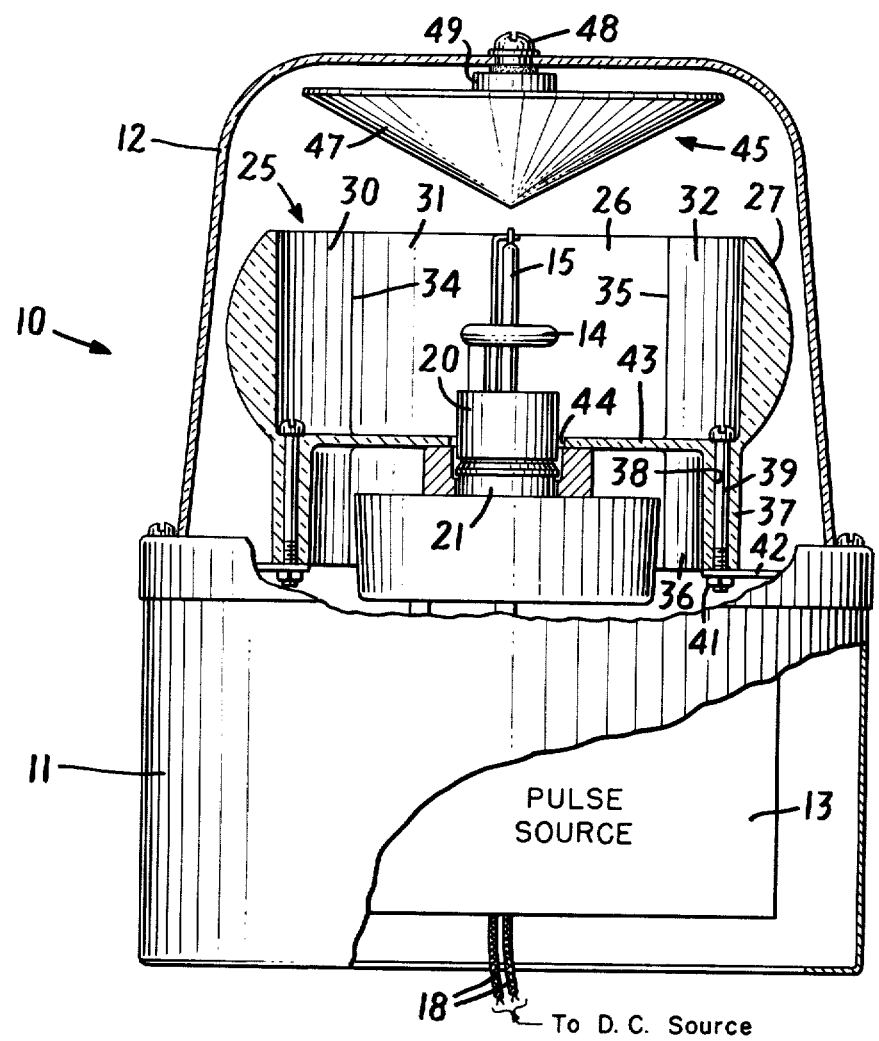
FIG. 1 is a front elevational view, partly in section, partly diagrammatic, and with sections broken away for clarity, of a beacon according to the invention with an encircling convergent lens and an upper conical reflector.

In FIG. 1, a beacon 10 includes a base section 11 and a familiarly shaped dome section 12. The base section 11 encloses a pulse source 13 which may be suitably chosen to light one or more gaseous discharge lamps 14 and 15. A pair of conductors 18 supply the pulse source 13 from a suitable D.C. source, in vehicular use the battery or battery-generator combination. The pulse source 13 may be chosen from a number of pulse sources known in the art. A preferred source is described in the copending patent application of John J. Scarpino, filed concurrently herewith, assigned to the assignee of the present invention, and identified with the Ser. No. 290,447.

The lamps 14 and 15 are the beacon's internal light source and are largely omnidirectional. "Largely omnidirectional" means that a substantial amount of light radiates from the lamp in all or almost all directions, but that the intensity of radiation in every direction is not necessarily entirely equal. Xenon discharge lamps are preferred for lamps 14 and 15. They are very intense for their size and emit a highly noticeable blue-white light. Lamp 14 is partly circular and is substantially horizontal. Lamp 15 is linear and extends vertically.

A removable plug 20 supports the lamps 14 and 15 to form a replaceable unit. The plug 20 cooperates with a receptacle 21 whose plural female connectors (not shown) are energized from the pulse source 13.

Encircling the lamps 14 and 15, an annular convergent lens 25 has a cylindrical interior surface 26 and an outer surface 27 convexly curved from top to bottom. Molded plastic segments form the lens. In FIG. 1 the segments are quadrants, three of which, 30, 31 and 32, are shown. These meet at their edges at lines 34 and 35. Each segment has a depending cylindrical supporting section 36 thickened at a boss 37 through which a bore 38 extends to receive a bolt 39. A nut 41 secures the bolt 39 and its associated lens segment to a suitable mount 42. A bottom plate 43 of the lens 25 is apertured centrally at 44 to receive the plug 20.

Above the lamps 14 and 15 a conical reflector 45 defines a reflective surface 47 sloping upwardly and outwardly away from the lamps. A threaded connector 48 extends into a stem 49 of the reflector 45 to support the reflector 45 from the top of the dome-like casing 12. Preferably, the reflector 45, the lens 25 and the lamps 14 and 15 are substantially coaxial.

Figure 2:
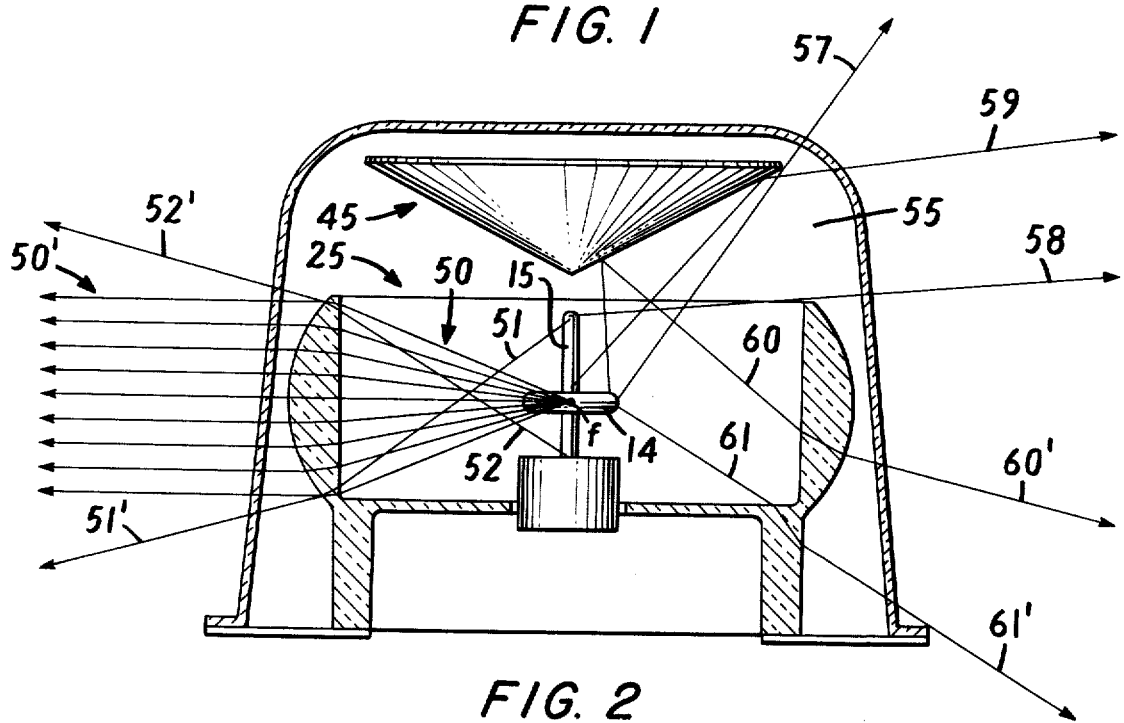
FIG. 2 is a diagrammatic illustration of the beacon of FIG. 1, and illustrates the optical effects of the beacon.

The operation of the beacon is best shown in FIG. 2. The light source, lamps 14 and 15 in this case, is located at or near the focal point of the lens 25. For purpose of illustration, plural divergent rays 50 are shown emanating as from a point source located at a focal point f. Again, to simplify matters for purpose of illustration, the lens 25 has been treated as a thin lens. The divergent rays 50 are shown emerging parallel from the lens 25 as rays 50'. The rays 50' emerge from the entire circumference of the lens 25 with each flash of the lamps 14 and 15, of course, and they form an intense belt of emerging rays or aureole which is substantially horizontal.

FIG. 2 is diagrammatic in its illustration of rays 50 originating from a point source, and it will be realized that the lamps 14 and 15 radiate from points along their entire lengths. Moreover, the focal length of the annular lens 25 may not place the focal point f on the central axis of the lens, or it may be desired to form the lens 25 so that the interior focal length terminates along the partly circular and horizontally disposed lamp 14. The partly circular configuration of the lamp 14 and its coaxial relationship to the annular lens 25 form with the lens 25 a combination particularly well suited to form the intense horizontal aureole.

Rays 51 and 52 from the ends of the linear discharge lamp 15 to the opposite upper and lower edges of the lens 25 emerge from the lens as rays 51' and 52'. These illustrate the respective lower and upper limits of the intensified and generally horizontal belt of rays. Other rays from both lamps 14 and 15 contribute to the intensified belt which is most intense in its central section, represented by the parallel rays 50'.

Intense, but not as intense as the light passing through the lens 25, directly radiated splash light passes upwardly and outwardly from all sides of the beacon through an open space 55 between the reflector 45 and the lens 25. A pair of rays 57 and 58 illustrate in FIG. 2 the respective upper and lower limits of the direct splash light radiation. This light effectively illuminates nearby trees, buildings, and other objects in the vicinity of the beacon to give a better than line of sight visibility to the beacon. Similarly, fog, mist and hanging dust particles are lighted when present to establish an illuminated halo increasing the visibility of the beacon.

Light radiated more directly skyward meets the reflecting surface of the reflector 45. Light from the reflector contributes to the splash lighting, as illustrated by a ray 59, and reflected light adds to the intensified light passing through the lens, as shown by a ray 60 emerging from the lens as ray 60'. Skyward light that ordinarily would have been wasted thus contributes to the usable light of the beacon 10.

To a lesser extent, reflected light and directly radiated light escape downward as illustrated, for example, by the ray 61. This causes a second, less intense splash lighting effect which illuminates the vehicle supporting the beacon 10 and increases its visibility.

The lens 25 is particularly suited for use as an intense nighttime alert with the flashing, largely omnidirectional internal source. FIG. 3 illustrates a very effective daytime lens configuration 65. The exterior portions of the system 65 include the segments 30–33, previously described. These segments continue to operate substantially as illustrated in FIG. 2 to collect light into an intensified substantially horizontal band or aureole. Within the segments 30–33, four additional segments 67–70, adjoining the interior surface of the combined segments 30–33, form a multifaceted refracting and reflecting combination 71. The outer surface of the combination 71 is cylindrical and cooperates with the inner surface of the convergent cylindrical lens formed by the segments 30–33. The inner surfaces of the inner segments 67–70 have vertically extending planar faces angularly disposed in a corrugated lens interior.

FIG. 4 best illustrates the effect of the refracting and reflecting interior of the lens arrangement 65. Whereas the convergent cylindrical lens 25 described above tends to form a single image of the light source, the lamps 14 and 15, at infinity, which is for practical purposes 25 feet or more from the source, the system 65 spreads the visible image of the source and increases daytime visibility by producing a greatly expanded illuminated area at the beacon. FIG. 4 illustrates approximately the difference between systems 25 and 65. The lower half of the diagrammatic arrangement of FIG. 4 represents the lens system 25 and is designated 25'; the upper half represents the lens system 65 and is designated 65'. A first viewer observing the internal light source L from a vantage point $V_1$ through the lens 25' sees, essentially, only the single source L of limited width. A second viewer from the vantage point $V_2$ perceives light rays emanating from a wider area on the lens system. The angular facets 75 greatly increase refraction through the lens system 65' as shown best by the exemplary rays 77, 77', and 78, 78'. In addition, combined reflection and refraction contributes, as well, to the spreading of light emanating from the lens. A ray 79, 79', 79'' exemplifies a reflected, then refracted ray. The few rays of FIG. 4 are, of course, illustrative only; multiple reflections occur, and the lens 65 is lighted more fully across its width. The viewer at $V_2$ does not see as clear an image of the light source L, but sees a larger illuminated area more effectively catching his attention during the day.

The inserts 67–70 can be separately formed and inserted in the lens arrangement 25, or the corrugated interior of the system 65 can be integrally molded with the exterior segments of the system. Of course, combinations of the two systems described so far are possible by alternately varying the segments, or by forming the corrugated interior surface only partly along the interior surface of the lens, horizontally or vertically.

FIG. 5 illustrates a further lens system 85 usable in the beacon 10. The four segments 87–90 again combine to complete the system circumferentially. Each segment 87, 88, 89, and 90 is a Fresnel or bull's-eye lens constructed according to conventional lens geometry with circular surface segments joining at circular delineating ridges. The Fresnel lens segments give good intensity and distance in a substantially unidirectional pattern. Typically, the beam from any one segment diverges about 20° from a central horizontal axis. Because each of the concentric ring-like segments contributes to the beam, the visible image is spread, not concentrated, at an image of the internal light source. The ridges that interlineate the ring-like segments cause diffraction and contribute some dispersion beyond the lens's concentrated beam.

FIG. 6 shows a further combination lens system 95 with two Fresnel segments 96 and 97 and two cylindrical convergent segments 99 and 100 formed essentially like any of the segments 30, 31 and 32 of the lens system 25 in FIG. 1. This arrangement gives the combined effect of the cylindrical convergent system 25 and the Fresnel system 85, and illustrates the flexibility of the beacon according to the invention. Other combinations of the lens segments are possible for particular uses.

Effective coloration of the light from the beacon can be achieved in several ways. The casing 12 can be colored to color both the emergent splash light and the light from the lens. The lens can be colored as desired. Selected lens segments can have differing colors to give, for example, different front and rear lighting on an emergency vehicle as desired in some localities. Preferably, the dome-like casing 12 remains clear and the lens colors its emergent rays. White or blue-white light, like that from a Xenon lamp, is very effective for splash lighting. Moreover, light from the reflector is visible in the horizontal plane. Combined with colored light from the lens the visible flash is particularly visually penetrating.

The foregoing description is not intended to restrict. Modifications in the preferred, exemplary embodiments described above will be apparent to persons skilled in the art and yet will embody the inventive features found in the preferred embodiments and defined in the appended claims.

We claim:

1. A surface vehicle-mounted emergency beacon including a lower support and mounting portion, a substantially cup-shaped, light-passing casing dome, a light source, electrical means for applying pulsed energization to the light source for flashing thereof, lens means within the dome supported by the support and mounting portion and encircling the light source for collecting light from the source into an intensified band generally horizontally emanating, an upper reflector above the light source and spaced from both the lens and the light source within the dome and generally concentric with the lens, the lens and reflector defining a generally annular opening therebetween, said reflector being configured to provide an upward and outward light path through said opening both directly and by reflection, thereby to illuminate the beacon's environs and to provide warning out of the line-of-sight to the beacon, the reflector further having a surface configuration defining means for diverting rays through both the lens and the opening, substantially reducing directly upward and wasteful skyward rays.

2. The beacon according to claim 1, wherein light from the light source is largely omnidirectional, and the source includes a horizontally disposed high intensity gaseous discharge lamp section encircled by the lens.

3. The beacon according to claim 2, wherein the horizontally disposed discharge lamp section is partly circular and substantially coaxially located with respect to the lens.

4. The beacon according to claim 1, wherein the lens has a light refracting and reflecting means formed on the lens inner surface for spreading the exteriorly visible lighting from within the lens horizontally across a larger lens area.

5. The beacon according to claim 4, wherein the inner surface of the lens has multiple angularly arranged and vertically extending facets thereon for causing diffraction and reflection of light from the source.

6. The beacon according to claim 1, wherein the lens is formed in molded plastic segments.

7. The beacon according to claim 6, wherein each lens segment has an integral downwardly projecting support section with a bore to receive a fastener attaching the segment to the support and mounting portion.

8. The beacon according to claim 1, wherein the dome differs in color from the lens and the beacon thereby produces light emanations of at least two colors.

9. The beacon according to claim 8, wherein the dome is clear to leave unaffected the color of light that misses the lens and passes through the dome to thereby illuminate the beacon's environs.

* * * * *